3,134,677
PARTIALLY HYDROLYZED ROASTED SESAME FOOD PRODUCTS AND PROCESS FOR PRODUCING SAME

Elmer F. Glabe, Chicago, Ill., assignor to John H. Kraft, Winnetka, Ill.
No Drawing. Filed May 7, 1956, Ser. No. 582,914
21 Claims. (Cl. 99—80)

This invention relates to sesame food products and their production, and particularly, to new products having enhanced keeping qualities and palatability, especially taste, flavor and texture.

This application is a continuation-in-part of my copending application, Serial No. 524,585, filed July 26, 1955, now abandoned, and the disclosure of the latter application is incorporated herein and made a part hereof by reference as fully as if it were set forth herein in its entirety.

Prior to the present invention, dehulled sesame seed has been used by the baking industry for decorative and flavoring purposes as a topping on rolls, bread and pastry. It has also been used as a major constituent in a type of confection known as halvah. However, raw sesame seed even if dehulled is not particularly flavorful, since it has a rather sharp, bitter character, which together with the texture of the inner hulls or pericarp makes eating of such seed not very pleasant. Sesame seed oil has also been used for a number of purposes in foodstuffs.

In the past, sesame seeds have been roasted or toasted prior to consumption, but the keeping qualities were not as good as desired, in fact, poorer than before roasting. The bitter character of the seeds was at most partly reduced, the roasted seed retained the fibrous texture, and the roasted seed was not uniform in color and degree of roast.

It is therefore an object of the present invention to provide new sesame seed food products and a process for their preparation which overcome the disadvantages of the prior products and greatly extend the usefulness and field of application of sesame seeds.

An important object of the invention is to provide new sesame seed food products which have greatly enhanced keeping qualities or shelf life.

Another important object is to provide new food products which have a very pleasing nutty flavor and, in the case of the new products retaining the form of the seeds, a pleasing crunchy texture. At the same time, the bitter "green" character of the sesame seeds is completely absent.

A further object is to provide a new sesame seed type food product including flakes, a new sesame paste food product, a new sesame meal including a flour, and a new sesame oil food product, each of which has very advantageous keeping qualities and is especially palatable, which products greatly extend the range of applications for sesame seeds and provide a large number of new and desirable foodstuffs.

An additional object is to provide a new process for preparing the new products which is effective in converting sesame seeds into materials of markedly improved properties and which may be carried out simply, effectively and reliably.

Another object is to provide a process for preparing a sesame seed food product which is economical and well suited for commercial application, permitting of the processing of large quantities of sesame seed for a large number of uses. These and other objects, advantages and functions of the invention will be apparent on reference to the specification.

By the invention, there are now provided new sesame food products which include a new sesame seed type product including flakes, a new paste derived from sesame seed, a new sesame meal including flour, and a new oil from the seed. The product having the form of the original sesame seeds is, however, chemically altered so that it has been rendered much more stable in storage and has qualities of taste, flavor and texture not previously possessed. These distinctive properties are likewise present in the new paste which is a ground product of the new seed composition, and the new properties are also retained in the oil derived from the processed seeds and the meal remaining after oil removal.

In the provision of the new products, a process is provided which involves subjecting a sesame seed product having the natural cellular structure to partial hydrolysis, preferably by heating in the presence of water vapor or moisture. Other hydrolysis methods may be employed. The partially hydrolyzed seed product is then roasted. It has been found that partial hydrolysis and roasting produces the new desirable flavor and texture, and the bitter green character of the seeds is no longer present in the product.

New sesame seed food products which also have superior keeping qualities are provided when the hydrolysis is carried out in the additional presence of an acid or a base. Inasmuch as the products are foodstuffs, the kind and quantity of the acid or base are such as are edible and non-toxic in the form taken by the acid or base and in the quantity remaining in the ultimate seed product. This presents little problem, since the amount of acid or base which need be employed is quite small. Innocuous organic and inorganic acids may be employed, preferably aliphatic carboxylic acids and inorganic acids. Especially advantageous are the food acids, such as acetic, tartaric and citric acids, and the amino acids, preferably glutamic acid. Of the bases which may be used, weak bases are advantageous such as innocuous organic and inorganic bases. The acids or bases may be employed in the form of their acidic or basic salts. Reference to an acid or to a base in the specification and claims is intended to include acidic or basic salts, i.e., which produce an acid or an alkaline pH in solution.

The initial sesame seed product is further preferably treated at the same time with common salt, sodium chloride, so that the products do not have a flat taste. When reference is made to sodium chloride, it is intended to include the use of an equivalent salt substitute. If desired, other materials which serve to flavor the products, such as other salts, may be used in addition. It is of course necessary that any material employed be edible and non-toxic in the proportions employed.

It has also been found in the invention that the hydrolysis is very desirably carried out in the presence of a sugar, without an acid or base, or sodium chloride. The product has an excellent flavor, which is more bland and is accompanied by a certain amount of sweetness. The keeping qualities are also apparently improved. By reference to a sugar is meant such as may be used in foodstuffs, e.g., sucrose, preferably, or dextrose, lactose, glucose, or any other monosaccharide or disaccharide.

It is preferred in the new process to mix the sesame seed product having the natural cellular structure, i.e., wherein the cellular structure is in its natural state as in the seed or a cellular product thereof, the acid or base and the common salt, and subject the mixture to the action of hot water vapor or steam, to effect the partial hydrolysis. The mixture is then roasted, to produce the new seed product.

Sesame seed is composed of an outer layer or cortex under which is another layer termed pericarp. Inside the pericarp is the endosperm. The outer layer or cortex is a very branny layer which is ordinarily removed, although the advantages of the invention can be achieved by treating the seed while still containing the cortex. Thus, sesame seed is ordinarily supplied in the form of dehulled or decorticated seed which still contains a number of thinner casings of pericarp which are rather high in fiber content and are of a tough character. It might be noted that this fiber content and character detract from the enjoyment of eating the seeds. Domestic white dehulled sesame seed may be represented by the following typical analysis:

| | Approximate percent |
|---|---|
| Oil | 50–57 |
| Protein | 27–35 |
| Minerals | 3.5–4.0 |
| Fiber | 2.5–3.0 |
| Moisture | 4.5–5.0 |
| Carbohydrates | 4.0–5.0 |

It will be seen that sesame seed is a high fat and high protein material, which renders it very useful for nutritive purposes, and there is a relatively small proportion of carbohydrates. No starch is known to be present. The dehulled seed may also be supplied in moisture-free form, or the moisture content may be higher, for example, up to 8%.

Proceeding according to the invention, the preferably dehulled sesame seed or other cellular seed product, e.g., seed from which some of the oil has been removed, is preferably mixed with an aqueous solution of an acid or base, preferably in the form of a salt where the salt form is acidic or basic. The form of the acid or base is also desirably chosen to provide appreciable solubility in water. It is also very advantageous to provide common salt in the solution admixed. Outstanding results are achieved by treating the sesame seeds with sodium glutamate, which is a basic salt, and common salt. However, other acids or bases may be employed, and in some cases, they provide desirable variations in flavor. The common salt may be omitted while still providing many of the advantages of the invention, but the most satisfactory and pleasing taste is achieved with its inclusion.

The sesame seed is contacted and impregnated with an aqueous solution preferably containing in percent by weight of the seed, about 0.001%–8% of common salt and about 0.001%–8% of acid or base. Preferably, with acidic or basic salts, the proportion of each of these ingredients is about 0.5%–8%, and it is further preferred to impregnate the seeds with about 1%–3% of each compound. With free acids or bases, about 0.1%–2% is the preferred proportion. In place of the common salt and acid or base, a sugar may be provided in the solution in a proportion of about 0.001%–8%, preferably 1%–3%.

Dry sesame seeds will absorb approximately 40% by weight of water. The seeds may be impregnated with as little as 0.1% by weight of water containing the acid or base and salt, or sugar, or as much as 40%. The solutes may be in equal proportions or in different proportions. Preferably, the amount of water is about 2.5%–15% by weight of the seed, and preferably about 5%–25% based on the water of each of the solutes, salt and acid or base, or sugar, is present in solution in the water. The solution is prepared by heating, if necessary.

The solution is thoroughly mixed with the decorticated sesame seed, which may be moisture-free or contain some moisture, as described above. When the mixture is vigorously agitated, about 10–15 minutes of agitation has been found to impregnate the seeds satisfactorily. Alternatively, slow continuous agitation extending over a longer period of time can be employed. The liquid is absorbed into the seed, and to some extent, the solutes are also adsorbed on the surface of the seed.

The seeds are then contacted with water vapor at an elevated or superatmospheric temperature, preferably with steam, which may be either at atmospheric or superatmospheric pressure, the period of contact decreasing somewhat with increase in pressure. The steaming is sufficient to drive the solutes into the seed, and an exothermic reaction apparently takes place at the same time. Thus, one phenomenon which has been discovered is that when the steam is at a temperature of about 99.5° C., the seed temperature in that steam is around 103° C. This phenomenon was not observed when the seed was steamed, after having been impregnated with water in the same manner, but which contained none of the solutes. The pH drops during steaming. When steaming at atmospheric pressure, as little as 2 or 3 minutes provides a noticeable effect, but it is preferred to contact the seed with steam for a longer period of time, on the order of 20–30 minutes. The moisture content of the impregnated and steamed seed represents the sum of the initial moisture content, the moisture introduced during impregnation with the aqueous solution, and the moisture introduced by the steam.

The seeds are then dried and roasted. Air or oven temperatures in the neighborhood of 350° F. have been found to be quite satisfactory, and the drying and roasting proceed with agitation. The first effect is to dry the seeds, and after reduction in moisture content, roasting or toasting takes place. Further decrease in pH may and generally does take place during roasting. At about 350° F., the drying and roasting time is advantageously about 25–35 minutes. The temperature of the seeds should be approximately 240–260° F. at the end of roasting. Of course, the conditions may vary depending upon the exact history of the material, the type of drier and other conditions.

After cooling the seeds, they exhibit a very slightly oily surface. After a short time, the oiliness disappears and the surface of the seeds appears to be quite free of oil, has a good uniform light brown color and has a pleasant aroma; the degree of roast is highly uniform. The seeds or other cellular product may then be easily chewed in the mouth, since the fiber has been made friable and the cell structure and texture have been sufficiently disintegrated to permit easy mastication. The somewhat bitter "green" character of the original seeds is completely absent, and the flavor is vastly improved, the product having a delightful nutty flavor. The shelf life of the seeds is excellent, for example, the odor and flavor are still good after four months' storage at 100° F.

By virtue of the new and improved seed composition, it is now also feasible and desirable to grind the seeds into an oily paste which serves as a new foodstuff alone or as an ingredient in other food products. The whole seeds may be merely lightly crushed, to produce sesame flakes. Also, the oil may be separated from the paste, and it and the remaining meal likewise are much improved new and distinctive products. Removal of oil to a meal oil content below about 36% produces a valuable flour.

The new seed product, whole or in the form of flakes, may be used in or on bread or rolls and pastry. It has been found especially advantageous to place the seed products directly in the dough, to furnish a new "sesame bread," roll or pastry in which the flavor is carried throughout the loaf or baked article and not only on the top crust. For example, about 1–30% by weight of the flour is very desirable. Toasting of bread slices serves to further bring out sesame flavor in the bread.

The seed product is also desirably used together with peanuts in candy and in ice cream cones, canned meat food products, breading and frying meals, pie crusts and pie fillings. In cookies, the seed product incorporated in the dough or batter imparts a nutty character and flavor reminiscent of more expensive ground pecans. Ten to twenty percent of the seed product, based on the flour, produces a marked effect. Novel ice cream compositions result from incorporation of both seed and paste in ice cream. The seed product furnishes unique taste and keeping quality in candy, in bar centers. It is a desirable adjunct to peanuts in candy bars. High protein and high fat food products are made with the seed product.

The paste is especially useful for providing "background taste" and has the above utilities in common with the seed product. The oil has been released from the cellular material and has shortening value in bread, and adds to the fat increments of candies and cookies. Thus, for example, using the paste at the rate of about 4% on the flour weight in conjunction with 8–12% of whole seed product provides an essential basic flavor in a unique specialty bread. Because of the shortening value, lard in the bread formula may be reduced in quantity. The high protein value advantageously supplements or supplants the non-fat or full fat milk powder normally used in bread. In sugar cookies, 5% of the paste provides a cookie with about 10% more spread, more tender texture, more top glaze, and a distinctly nutty flavor. In white vanilla caramel candy, as little as 2% of the paste gives a nutty character without change of color. The paste serves as an accelerator of peanut flavor in bars.

The oil product is also more widely useful than the prior product known as sesame oil. The paste and the oil serve valuably to increase the keeping qualities of other foodstuffs with which they are mixed. The meal remaining after oil removal is similarly useful and has a reduced oil content. The homogenized paste has a particularly pronounced effect in improving bread product softness, and, very importantly, in retention of softness. Staling and firming of the crumb structure are inhibited. It appears that the homogenized sesame product retards retrogradation of the starch. Also, the homogenized paste has been discovered to constitute a surprisingly effective dispersing agent for the difficulty-dispersible monoglycerides of fatty acids, which are favored as supplements in bread baking to enhance crumb softness and prevent retrogadation of the starch during storage. The combination of the two agents, paste and monoglyceride, produces a softer crumb than either alone.

The sesame flour is especially valuable. This form of the meal may be produced by hydraulic pressing, continuous expelling, or solvent extraction and may also be used in bread and baked products. The oil content of the flour may range from 0.5% to 36% depending upon the separation method used. It may be used in like manner to the whole seed with standard white bread formulae, for example, at a level up to about 16% by weight of the wheat flour in the formula, preferably at a level of about 4–6%. The sesame flour also may serve to replace a large proportion of the wheat flour in white bread formulae, e.g., as much as 50%. It may be used in place of wheat flour in a specialty bread normally prepared with a flour portion of 40–50% wheat flour and 60–50% of extracted wheat gluten. Levels up to 75% of sesame flour and 25% of wheat gluten, for example, may be used.

The following examples are furnished to illustrate the invention, and it is to be understood that the invention is not limited to the particular materials, proportions or procedures given therein, which are set forth for illustrative purposes only. The proportions are by weight unless otherwise specified.

*Example 1*

A solution of 50 grams of water, 10 grams of sodium chloride and 10 grams of monosodium glutamate, a basic salt giving an alkaline pH in solution, was prepared by bringing the solution to the boiling point. The solution was then poured over 1000 grams of domestic pure white decorticated sesame seed, the seed having an initial moisture content of about 5%. The solution and the seed were agitated vigorously for about 10 minutes, during which the liquid was absorbed into the seed and raised its moisture content to about 10%.

The impregnated seed was steamed at atmospheric pressure for about 20–30 minutes. The steam temperature was 212° F., while the seed temperature rose to 217° F. The steaming raised the moisture content of the seeds to about 15–17%.

The seeds were transferred to a drier, which may be a tray, a rotating type or a conveyor type drier. The temperature of the atmosphere in the drier was about 350° F. The seeds were agitated constantly to provide uniform roasting, and the total time in the drier was 25–32 minutes. The temperature of the seeds at the finish of roasting was about 240–260° F.

The roasted seeds were rapidly cooled in air and showed a slightly oily surface. After a short time the oiliness disappeared, and the surface appeared to be dry and oil-free, and had a light brown color and pleasant aroma. The qualities of the seed were as described above.

The pH values of the material were determined in several stages of the process to be as follows:

Raw seeds _____ 7.0–7.2
After steaming _____ 6.7–6.8
After roasting _____ 6.4–6.6

The pH of the raw seeds may be as low as about 6.6, depending on the prior dehulling and washing conditions.

When the treatment of sesame seed was repeated with the omission of the sodium chloride, the properties of the product were comparable except that the product had a flat taste.

*Example 2*

The process of Example 1 was repeated, with the exception that a commercial protein hydrolysate solution was employed. The aqueous solution contained 20.5% by weight of mixed amino acids and amino acid salts, 14% of sodium chloride and 3.5% of ammonium chloride, and is identified as L–625 Liquid Hydrolyzed Vegetable Proteins (Huron Milling Co.). The solution poured over the seeds was made up of 35 grams of water, 8 grams of sodium chloride and 25 grams of the protein hydrolysate solution.

The roasted seed product had a pleasant flavor which was slightly different from that obtained according to Example 1.

*Example 3*

The process of Example 1 was repeated, except that the seed was impregnated with 400 grams of water, 80 grams of sodium chloride and 80 grams of monosodium glutamate. In this case, the seed was moisture-free. The qualities of the product were very good, corresponding to those obtained according to Example 1.

*Example 4*

When the process of Example 1 was repeated with 1 gram of water, 0.01 gram of sodium chloride and 0.01 gram of sodium glutamate, it was found that there was a significant effect upon the flavor and keeping properties of the seed.

*Example 5*

To evaluate the qualities of the products, seed which had been impregnated with 1% sodium chloride and 1% monosodium glutamate was compared with decorticated sesame seed which had not been otherwise treated, and decorticated seed which had been steamed and roasted as described above but without salt and amino acid salt impregnation. The several types of seed were stored at 100° F. and 80% relative humidity in ordinary paper bags.

The decorticated sesame seed had a poor odor and flavor after 45 days and was definitely rancid in 60 days. The decorticated seed which had been merely steamed and roasted showed signs of rancidity at about 30 days which was very definite in 45 days. However, the flavor and texture were initially much improved, so that the product is very useful where keeping quality is not a factor.

The decorticated seed treated with sodium glutamate and salt had the new properties of flavor and texture and had a good odor and flavor at the end of 120 days. These superior keeping qualities were of the same order of magnitude when the sodium chloride was omitted. On the other hand, when the salt was retained and the sodium glutamate was omitted, flavor and texture were improved but rancidity occurred considerably earlier. These results illustrate that the embodiment of the invention wherein a base or an acid is used provides a product having a greatly increased shelf life, much superior to the other materials.

It was also found that the paste made by grinding the seed product of the sodium glutamate and salt treatment had a much longer shelf life than paste made by grinding seed which was merely steamed and roasted. Furthermore, this new paste product imparted longer keeping properties to other foodstuffs with which it was incorporated. Thus, for example, peanut butter stored at 100° F. acquires a tallowy taste in 30 days. When 20% of the new paste product was mixed with 80% of peanut butter, the shelf life was extended to 40 days.

*Example 6*

1000 grams of decorticated sesame seed was mixed with a solution of 150 grams of water, 30 grams of sodium chloride and 30 grams of monosodium glutamate. The impregnated seeds were steamed and dried and roasted as described in Example 1.

The roasted seeds were ground to a homogeneous paste in a Carborundum mill. This homogenized paste was then suitable for use as a foodstuff, alone or in admixture with other foodstuffs. The paste product has a very low moisture content, approximately 0.4–2%.

The paste was placed in a centrifuge, and the oil was separated thereby and was vacuum filtered through asbestos or other suitable filtering material. A similar quantity of oil was prepared in a like manner except that the sesame seed was merely steamed and roasted and was not impregnated with the salts. Both oils had the improved palatability characteristics described.

The oils were stored at 100° F. and were examined at 28 hours and periodically thereafter up to 120 days. At 28 hours, the oil from the seeds which were merely steamed and roasted was slightly rancid, and at 120 days, it was very rancid. The oil prepared with salt and sodium glutamate had a good odor and flavor as late as 120 days.

The oil may be separated or extracted partly or completely in other ways than the above or other pressure method, for example, by extraction of the oil with an organic solvent. The unground seed product, partially crushed seed or flakes, or the paste may be extracted. The solvent may be a hydrocarbon, for example, petroleum ether, hexane, or benzene. Acetic acid-chloroform is an especially advantageous solvent.

The residue from centrifuging the paste is a mass with the consistency of a heavy paste having a fat content of about 40–45% by weight, and it is valuably employed in breads, rolls and pastries, for example. By reducing the fat content to below about 36%, the meal takes the form of a flour which may, for example, be used to replace a large proportion of the wheat flour or wheat gluten in bread. Thus, the seed product may be compressed in a hydraulic press to express the oil, to produce a flour containing about 20–36% of oil. Removal of the oil in an expeller reduces the oil content to about 5–6%. Solvent extraction yields a flour having an oil content as low as 0.5%. The several types of flour serve as high protein and low fat flours, and the fat content may be regulated as desired below about 36%, preferably about 0.5% to 36% oil.

*Example 7*

The process of Example 1 was repeated, except that the solution poured over the seeds was composed of 50 grams of water and 2.5 grams of glacial acetic acid.

The roasted seed product had a rather sweet taste and a darker color for the same roasting time, indicating a possible effect on the carbohydrate content. The seed product had the desirable properties described, and the flavor was, in general, sweet and bland.

Similar results were obtained when, instead of 2.5 grams, 0.1 gram and 20 grams, respectively, of glacial acetic acid were used.

*Example 8*

The process of Example 1 was repeated, except that the solution poured over the seeds was composed of 50 grams of water and 10 grams of hydrochloric acid (100% HCl basis). The pH of the impregnated seed before steaming was found to be 3.8.

The properties of the roasted seed product were like those of Example 7.

*Example 9*

The process of Example 1 was repeated, except that the solution poured over the seeds was composed of 50 grams of water and 20 grams of sucrose.

The roasted seed product had the new properties of flavor and texture, with a more bland flavor than the product of Example 1 and a degree of sweetness, especially useful in cookie making. The product exhibited better keeping qualities than seeds steamed and roasted, or merely roasted.

In place of the sucrose, dextrose, lactose or glucose is used with like advantageous results.

*Example 10*

The process of Example 1 was repeated, except that the solution poured over the seeds was composed of 50 grams of water, 10 grams of sodium chloride and 10 grams of sodium carbonate, prepared by bringing the solution to the boiling point. The roasted seed product had excellent taste, flavor, texture and odor.

The pH values of the materials were found to be as follows:

Raw seed _____ 7.5
Mixed seed and solution _____ 8.4
After steaming _____ 8.3
After roasting _____ 7.4

*Example 11*

The stability of the new products is further shown by the results of the Active Oxygen Method for determining the stability of edible oils. In this method, the product is maintained at 110° C. while air is bubbled through at a uniform rate. The number of hours required to raise the peroxide value to 100 milli-equivalents per kilogram of oil is known as the A.O.M. value. Higher values denote longer keeping oils, and one-half hour difference is significant.

For compartive purposes, refined cottonseed oil has an A.O.M. value of about 12, and commercial refined sesame oil about 10–12.

The homogenized sesame product of Example 6 had the astonishing A.O.M. value of 82.5. Oil obtained by hydraulically pressing the seed product of Example 1 had A.O.M. values from 28.5 to 39, most being about 35–39. The very high value for the homogenized product indicates the presence of additional stabilizing factors not removed with the oil.

*Example 12*

When the homogenized sesame product of Example 6 was solvent-extracted, an acetic acid-chloroform extracted oil had an A.O.M. value of 72, and a benzene extracted oil had a value of 25.5. The former solvent was thus much more efficacious in extracting the stabilizing factors with the oil, and the method constitutes an important embodiment of the invention.

In this method, 100 grams of homogenized sesame paste was extracted with 200 grams of solvent containing 60% of acetic acid and 40% of chloroform, by stirring and shaking for 15 minutes, settling and decanting. The settled material was extracted twice more, with 100 grams of the solvent each time, and filtering with the decantation. The solvent fractions were combined, and heated at atmospheric pressure to distill off the solvent. The oil remaining was heated at about 150° F. for about one hour, to remove the last of the solvent. The oil product had the above A.O.M. value 72.

*Example 13*

It was found that the oil hydraulically expressed from the seed product of Example 1 can be treated with an acid to increase its A.O.M. value.

In this advantageous method, 98 grams of expressed oil was stirred with 2 grams of constant boiling hydrochloric acid for about 1–2 hours at about 100° F. The resulting two layers were decanted and filtered, to separate the oil. The A.O.M. value increased from 28.5 for the initial oil to 43.5 for the acid-treated oil.

While the invention is not limited to any theory and without intending to be bound by the discussion thereof, the new process apparently produces chemical changes in the seed initially and possibly also during subsequent storage that inter alia markedly increase the amount of sesamoline and sesamol present or their availability over the amounts or availability which occur naturally in the seed. It appears that the markedly improved keeping qualities of each of the several new foodstuffs may be due at least in part to this increased quantity or availability of sesamoline and sesamol, resulting in increased antioxidant effects. Chemical changes are likewise believed to be responsible for the much improved properties of taste, flavor and texture.

There are thus provided by the invention new sesame seed-derived food products of greatly extended utility which have new and much improved properties. The new process provides the dual functions of markedly enhancing the keeping qualities and improving the palatability, eliminating bitterness, rendering the products flavorful, and producing a crunchy texture. The products may be used in a wide variety of foodstuff applications, alone or in conjunction with other foodstuffs. The process is very effective in providing a surprising alteration and improvement in the properties of the several products, and the process is well suited to large scale commercial production.

This application contains disclosure common to and claimed in my copending application, Serial No. 582,913, filed of even date herewith, now abandoned, and the disclosure of the latter application is also incorporated herein by reference.

The invention is hereby claimed as follows:

1. The process for preparing an improved sesame food product which comprises mixing a sesame seed product having the natural cellular structure and a compound selected from the group consisting of acids, bases and sugars, heating the resulting mixture in the presence of water vapor to drive said compound into said seed product and effect partial hydrolysis of said seed product, and roasting the product of hydrolysis.

2. The process for preparing an improved sesame food product which comprises mixing a sesame seed product having the natural cellular structure and an aqueous solution of a solute selected from the group consisting of acids, bases, and sugars, steaming the resulting mixture to drive said solute into said seed product and effect partial hydrolysis of said seed product, and roasting the steamed product.

3. The process for preparing an improved sesame food product which comprises mixing a sesame seed product having the natural cellular structure and an acid, steaming the mixture to drive said acid into said seed product and effect partial hydrolysis of said seed product, and roasting the steamed product.

4. The process for preparing an improved sesame food product which comprises mixing a sesame seed product having the natural cellular structure and a base, steaming the mixture to drive said base into said seed product and effect partial hydrolysis of said seed product, and roasting the steamed product.

5. The process for preparing an improved sesame food product which comprises mixing a sesame seed product having the natural cellular structure and a sugar, steaming the mixture to drive said sugar into said seed product and effect partial hydrolysis of said seed product, and roasting the steamed product.

6. The process for preparing an improved sesame food product which comprises mixing a sesame seed product having the natural cellular structure and an amino acid salt, steaming the mixture to drive said salt into said seed product and effect partial hydrolysis of said seed product, and roasting the steamed product.

7. The process for preparing an improved sesame food product which comprises mixing a sesame seed product having the natural cellular structure and an inorganic acid, steaming the mixture to drive said acid into said seed product and effect partial hydrolysis of said seed product, and roasting the steamed product.

8. The process for preparing an improved sesame food product which comprises mixing a sesame seed product having the natural cellular structure and a food acid, steaming the mixture to drive said acid into said seed product and effect partial hydrolysis of said seed product, and roasting the steamed product.

9. The process for preparing an improved sesame food product which comprises mixing a sesame seed product having the natural cellular structure and sodium glutamate, steaming the mixture to drive said sodium glutamate into said seed product and effect partial hydrolysis of said seed product, and roasting the steamed product.

10. The process for preparing an improved sesame food product which comprises mixing a sesame seed product having the natural cellular structure and sucrose, steaming the mixture to drive said sucrose into said seed product and effect partial hydrolysis of said seed product, and roasting the steamed product.

11. The process for preparing an improved sesame food product which comprises impregnating sesame seed with an aqueous solution of salt and sodium glutamate, steaming the impregnated seed to drive said sodium glutamate into said seed and effect partial hydrolysis of said seed, and roasting the steamed product.

12. The process for preparing an improved sesame food product which comprises mixing a sesame seed product having the natural cellular structure and an aqueous solution of a solute selected from the group consisting of acids, bases, and sugars, steaming the resulting mixture at atmospheric pressure for a period of time of about 20 to 30 minutes to drive said solute into said seed product and effect partial hydrolysis of said seed product, and roasting the steamed product.

13. The process for preparing an improved sesame food product which comprises mixing a sesame seed product having the natural cellular structure and about 0.1% to 2%, based on the weight of the seed, of a free acid, steaming the resulting mixture to drive said acid into said seed product and effect partial hydrolysis of said seed product, and roasting the steamed product.

14. The process for preparing an improved sesame food product which comprises mixing a sesame seed product having the natural cellular structure and about 0.1% to 2%, based on the weight of the seed, of a free base, steaming the resulting mixture to drive said base into said seed product and effect partial hydrolysis of said seed product, and roasting the steamed product.

15. The process for preparing an improved sesame food product which comprises mixing a sesame seed product having the natural cellular structure and about 1% to 3%, based on the weight of the seed, of a basic salt, steaming the resulting mixture to drive said salt into said seed product and effect partial hydrolysis of said seed product, and roasting the steamed product.

16. The process for preparing an improved sesame food product which comprises mixing a sesame seed product having the natural cellular structure and about 1% to 3%, based on the weight of the seed, of an acidic salt, steaming the resulting mixture to drive said salt into said seed product and effect partial hydrolysis of said seed product, and roasting the steamed product.

17. The process for preparing an improved sesame food product which comprises mixing a sesame seed product having the natural cellular structure and about 1% to 3%, based on the weight of the seed, of a sugar, steaming the resulting mixture to drive said sugar into said seed product and effect partial hydrolysis of said seed product, and roasting the steamed product.

18. The process for preparing an improved sesame food product which comprises impregnating sesame seed with an aqueous solution containing 0.5% to 8%, based on the weight of the seed, of sodium glutamate, steaming the impregnated seed at atmospheric pressure for a period of time of about 20 to 30 minutes, and drying and roasting the steamed product at an oven temperature of about 350° F. for a period of time of about 25 to 35 minutes.

19. The process for preparing an improved sesame food product which comprises mixing a sesame seed product having the natural cellular structure and a compound selected from the group consisting of acids, bases and sugars, heating the resulting mixture in the presence of water vapor to drive said compound into said seed product and effect partial hydrolysis of said seed product, roasting the product of hydrolysis, and grinding the roasted product to a paste.

20. The process for preparing an improved sesame food product which comprises mixing a sesame seed product having the natural cellular structure and a compound selected from the group consisting of acids, bases and sugars, heating the resulting mixture in the presence of water vapor to drive said compound into said seed product and effect partial hydrolysis of said seed product, roasting the product of hydrolysis, and separating oil from the roasted product by extraction of the oil with a solvent of acetic acid and chloroform.

21. A food product consisting of partially hydrolyzed roasted whole sesame seeds impregnated with an extraneous flavoring substance.

References Cited in the file of this patent

UNITED STATES PATENTS

| | | |
|---|---|---|
| 2,052,215 | Cohn | Aug. 25, 1936 |
| 2,172,699 | Cohn | Sept. 12, 1939 |
| 2,267,747 | Plews | Dec. 30, 1941 |
| 2,627,462 | Pettibone | Feb. 3, 1953 |
| 2,795,502 | Raymond | June 11, 1957 |
| 2,926,091 | Riddle | Feb. 23, 1960 |

FOREIGN PATENTS

| | | |
|---|---|---|
| 141,341 | Great Britain | June 30, 1921 |
| 364,309 | Great Britain | Jan. 7, 1932 |